Nov. 17, 1931.  R. L. WILCOX  1,832,167
METHOD FOR MAKING NUTS, BOLT, RIVET, AND
SCREW BLANKS, AND OTHER ARTICLES
Filed April 21, 1930  3 Sheets-Sheet 1
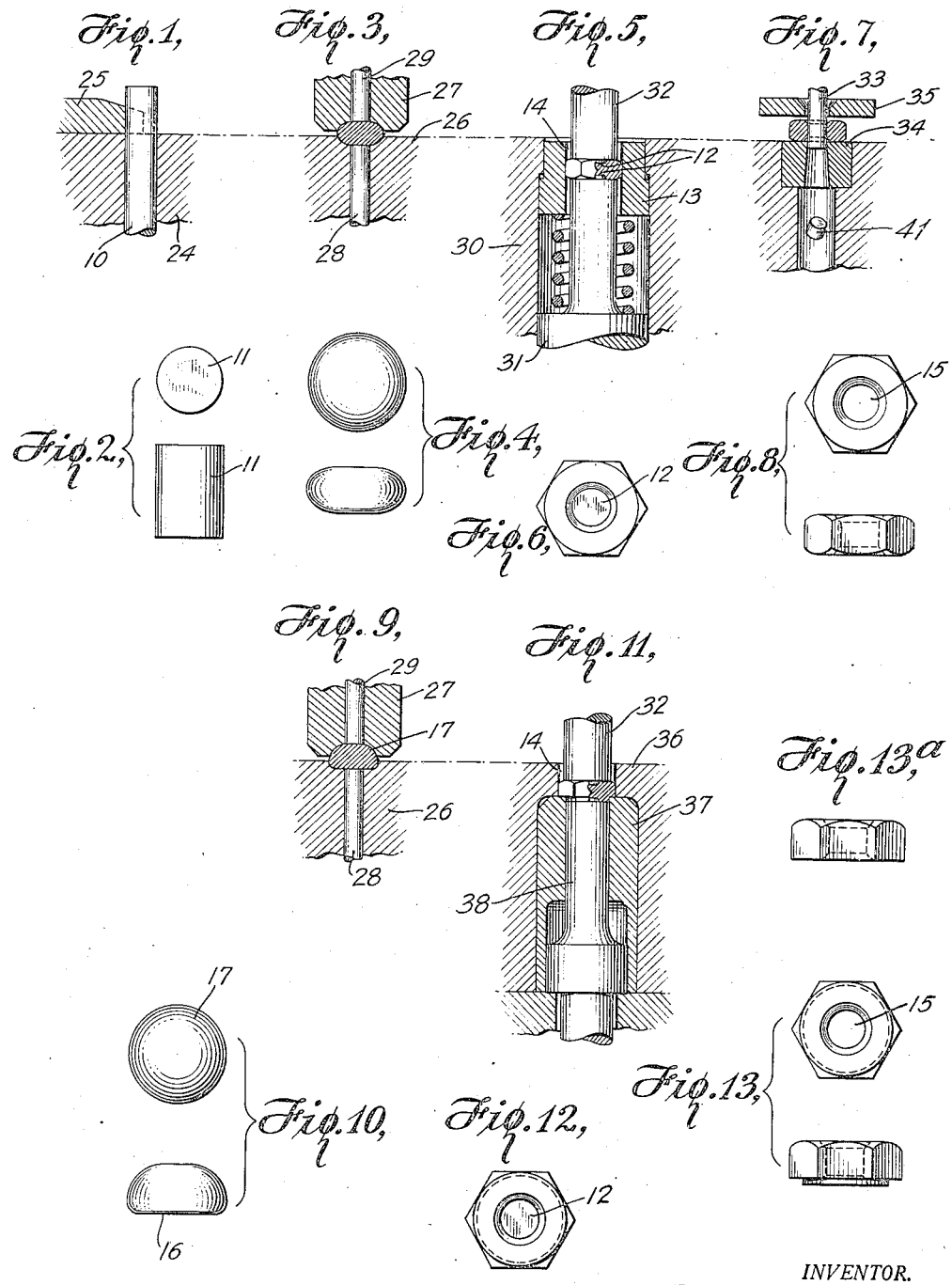
INVENTOR.
RICHARD LESTER WILCOX.
BY
ATTORNEY Nov. 17, 1931. R. L. WILCOX 1,832,167
METHOD FOR MAKING NUTS, BOLT, RIVET, AND
SCREW BLANKS, AND OTHER ARTICLES
Filed April 21, 1930   3 Sheets-Sheet 2
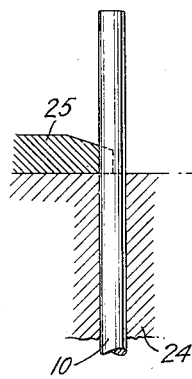
Fig. 14.
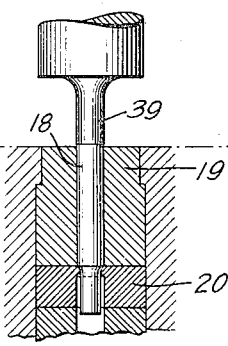
Fig. 16.
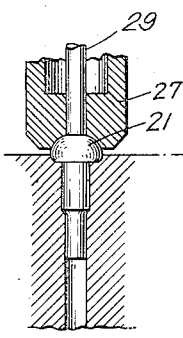
Fig. 18.
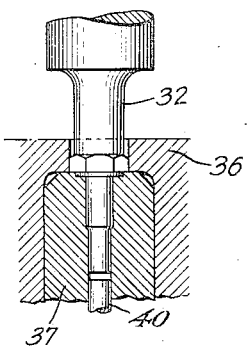
Fig. 20.
Fig. 15.
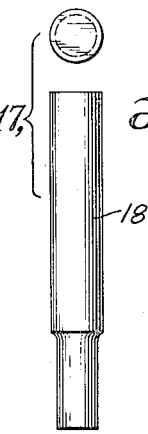
Fig. 17.
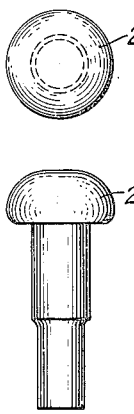
Fig. 19.
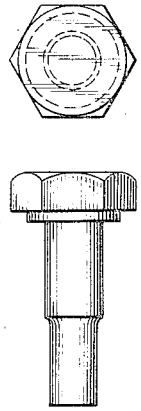
Fig. 21.
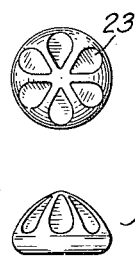
Fig. 23.
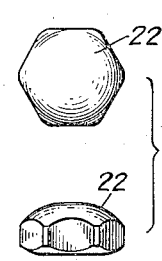
Fig. 22.
INVENTOR.
RICHARD LESTER WILCOX.
BY
ATTORNEY Nov. 17, 1931.   R. L. WILCOX   1,832,167
METHOD FOR MAKING NUTS, BOLT, RIVET, AND
SCREW BLANKS, AND OTHER ARTICLES
Filed April 21, 1930   3 Sheets-Sheet 3
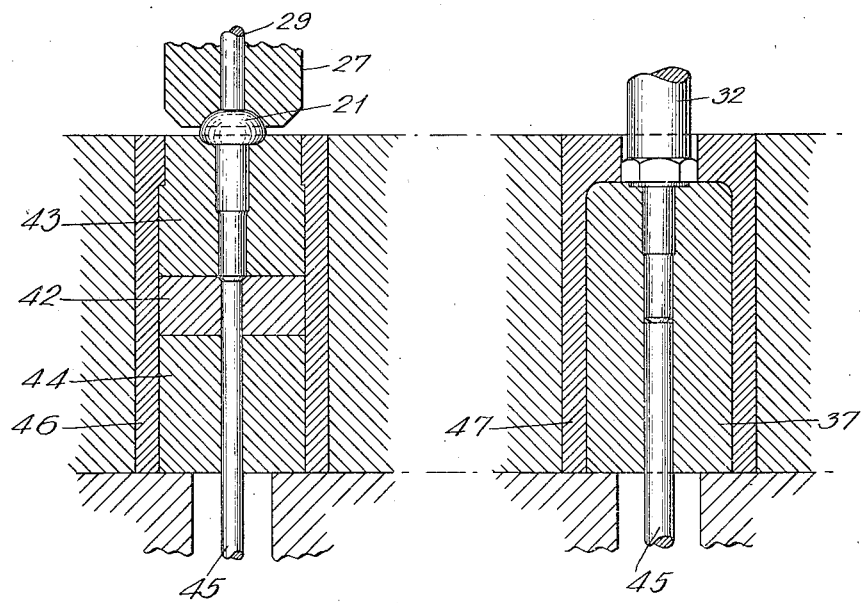
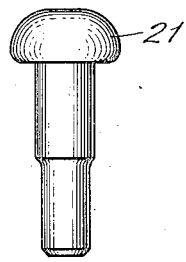
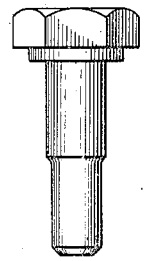
INVENTOR.
RICHARD LESTER WILCOX.
ATTORNEY Patented Nov. 17, 1931

1,832,167

UNITED STATES PATENT OFFICE

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT

METHOD FOR MAKING NUTS, BOLT, RIVET AND SCREW BLANKS, AND OTHER ARTICLES

Application filed April 21, 1930. Serial No. 445,977.

This invention relates to a new and improved method for making nuts, bolt, rivet and screw blanks and other articles, having for its object, among other things, to produce nuts, bolt, rivet and screw blanks, and other articles, without waste of material and particularly if such have one or more chamfered faces, these being produced without application of pressure at or on the chamfered faces; a further object being to extrude such of said articles as are in the form of a bolt, rivet or screw blank or the like, and if desired, to also point the end thereof.

To these, and other ends, my invention consists of certain steps which will be more fully explained hereinafter and pointed out in the appended claims.

For the purpose of illustration of my improved method I have adopted the forming of a hexagon nut of the usual type, a hexagon head upon a bolt blank, and also extruding and pointing the same.

Other shapes and forms may, of course, be produced as desired.

In the drawings, wherein like numerals of reference designate like parts in the several figures:

Figure 1 illustrates mechanism for cutting off a blank from a wire or rod length;

Figure 2 is a view of the blank as thus cut off;

Figure 3 is a view of the blank formed in a double dome shape by tools such as shown therein;

Figure 4 is a view of the double dome blank as thus shaped;

Figure 5 is a view of the blank as formed at the next operation by tools such as shown therein, the blank now having assumed substantially a polygonal form in cross section with concentric depressions in the opposite faces thereof.

Figure 6 is a view of the blank as thus shaped;

Figure 7 is a sectional view of the blank at its next operation where the hole is pierced therethrough;

Figure 8 is a view of the completed nut as thus formed;

Figures 9 and 10 are similar to the views shown in Figures 3 and 4, except that the blank is domed on one side of the horizontal center thereof rather than on both sides, as in said Figures 3 and 4;

Figures 11 and 12 are similar to the views shown in Figures 5 and 6, except that the nut has a chamfer on only one face and a collar upon the opposite face;

Figure 13 is a view of one form of finished nut of the type illustrated in Figures 11 and 12.

Figure 13ª is a view of another form of finished nut;

Figures 14 and 15 are views similar to Figures 1 and 2, except that they illustrate a blank which is somewhat longer than the blank of Fig. 1 and designed to produce a bolt as distinguished from the nut of Figs. 1 and 2;

Figure 16 is a view of the blank as projected into the extruding die at a subsequent operation in the formation of the bolt;

Figure 17 is a view of the blank as formed by the tools illustrated in Figure 16;

Figure 18 is a view of the blank at another operation with a head upset thereon in the form of a dome of substantially the same shape as the dome shown in Figure 10;

Figure 19 is a view of the blank as thus formed;

Figure 20 illustrates another operation in the formation of the bolt, wherein the head is shown in its polygonal finished form, chamfered, and provided with a collar upon its under-face.

Figure 21 is a view of the bolt blank as thus formed;

Figure 22 is a modified form of the blank as produced in the second of the series of operations, more particularly illustrated in Figures 3 and 18;

Figure 23 is another shape in which the blank may be formed, the dome being upon one side of the blank and provided with a series of flat faces;

Figure 24 is a view of the blank projected into the pointing die;

Figure 25 is a view of a similar operation upon the blank as illustrated in Figure 20;

Figure 26 is one form of an extruded and pointed blank; and

Figure 27 is a similar view of another form of blank.

In the drawings, 10 illustrates a portion of a wire or rod length, which is of relatively small diameter as compared with the outside dimensions of the finished article, and having a length greater than the thickness of the finished article.

Preferably the blank 11 is produced by shearing it from the rod 10, which involves no loss of material, but the blank, however, may be of cast metal, or otherwise produced, if desired.

Figures 3 and 4 illustrate the blank, the former in cross section, after having been subjected to the first compression operation of my method. The blank as thus shaped has a dome on each side of the horizontal center thereof, with a substantially flat surface upon the top and bottom thereof and the outer edge rounded from top to bottom.

A blank substantially in the shape of a ball instead of the shape as shown in Figure 4 may be presented for the said first compression operation if desired.

In Figures 5 and 6 a blank is illustrated after being subjected to a succeeding compression operation, wherein its external shape is completed, the former figure illustrating the blank partially in section.

At this operation I preferably provide a depression 12 in either or both of the opposite faces of the blank.

The die 13 in which this last mentioned compression operation is performed has an opening 14 substantially the same shape in cross section as that of the article formed therein, and the diameter of the blank, as shown in Figures 3 and 4 is substantially the same as the diameter of the opening between the flat sides thereof.

In this operation, pressure is applied to only a portion of the face of the blank, with the result that the flow of the metal, unrestrained and unconfined, will leave the upper and lower edges thereof chamfered in its completed form.

The pressure tools, as shown in Figure 5, are of less diameter than the distance between the flat sides of the opening in the die 13, but they may be of the same shape in cross section as such opening, in which case, the cavity formed between the opposing faces of the compression members inside of the die opening will not be completely filled by the flow of the metal in the blank, the void or vacant place being at the upper and lower edges thereof at the point where the chamfer faces are formed.

After the blank is shaped as in Figure 5, the hole 15 is pierced therethrough by removing the metal from between the depressions 12. These depressions are preferably so shaped as to be slightly flaring at their ends, with the result that the hole 15 has countersunk outer edges, which obviates the necessity of cutting off that portion of the stock of the blank thrown outwardly by the threading operation.

The nuts produced in the operations above described are flat on the opposite faces and chambered on both sides.

To form a nut having a chamfer on one face, with a collar on the opposite face, the blank may be shaped in the first compression operation with a flat under-face 16 and the dome coned at 17 upon only one side of the horizontal center thereof. The blank as thus formed is subjected to compression tools and the metal at the lower portion of the blank flows outwardly and fills the entire cavity in the die opening, while the metal at the upper portion does not flow outwardly the full distance and the upper face is thus formed with a chamfer.

The nut may be as readily formed without a collar by merely extending the length of the knockout rod 38 so that it is flush with the bottom edge of the die opening 14.

Thus, by this method a nut is formed completely chambered with a minimum waste of material, that being the slug 41 cut therethrough to form the opening 15.

The size of the compression tools as used in this machine is relatively unimportant and the fit thereof into openings in dies, etc., is of little or no consequence.

Figures 14 to 21 illustrate the above described method as applied to the formation of a bolt blank with a head thereon, which in many respects resembles that of a nut with a shank upon one side.

In Figures 14 and 15 the rod 10 is present and by the same shearing process a blank 18 is produced, which is, of course, longer than the blank 11. In a succeeding operation the blank is projected through a die 19, having an opening therein of substantially the same diameter as the blank 11, and into an extruding die 20, which reduces and lengthens a portion thereof. The opposite end of the blank is then subjected to pressure and a coned head 21 formed thereon, its shape being substantially the same as the blank illustrated in Figures 9 and 10, or it may be substantially the same shape as the blank illustrated in Figure 4 if it is desired that the chamfer be upon both the top and bottom of the head. The blank is again subjected to pressure which forms the head with a polygonal shape in cross section, as shown in Figure 20, wherein the top face of the head is chamfered, and the underside provided with a collar substantially as shown in Figures 11, 12 and 13. This blank is now ready for a rolled thread operation, preferably upon the extruded portion thereof. A completed bolt with a chambered face is thus produced without a particle of waste material.

In Figures 22 and 23 are illustrated modified forms in which the blank may be shaped in the first compression operation.

Instead of the forms shown in Figures 4 and 10, the blank may be compressed into a shape with cross section approximating the finished shape of the nut, and if the chamfer is upon only one side of the blank the dome 22 upon one face thereof may be higher than that upon the opposite side, whereby to produce a nut substantially as shown in Figure 13, either with or without a collar.

In Figure 23 the blank is formed with flat faces 23, so positioned relatively that in a subsequent compression operation they will be opposite the flat sides of the finished article, wherein less flow of metal is required than at the corners, thus reducing the extent of the flow of the metal where desirable and with some kinds of metal this is an advantage.

The extruding operation shown in Figure 16 may follow instead of preceding a compression operation, if preferred.

The end of the blank may be pointed, as illustrated in Figures 26 and 27, if desired. In such case a pointing die 42 is mounted adjacent to the heading die 43, and suitably supported by a filled block 44, all of which are assembled in a sleeve 46. A knockout pin 45 is operable in both the pointing die and filler block with the end face thereof in one of its positions in substantially the same plane as the end of the blank to prevent further movement of the blank in the dies, as shown in Figure 24.

The structure shown in Figure 25 differs from that shown in Figure 20 principally in the fact that the block 37 is mounted in a sleeve 47.

Heretofore it has been the practice to point a blank by a cutting tool, in a machine separate from the forming machine, and by wastage of material. Thus in my improved method, the blank is formed complete for the threading operation by compression tools.

While the tools necessary to cut off the blank or to perform other operations of my invention constitute no part of this present invention, I have, however, illustrated one form or set of such tools as will produce the desired results, this showing by drawings and specification being incorporated for the purpose of illustration.

In Figures 1 and 14, 24 designates the die, 25 the cutter that moves by any convenient mechanism at substantially a right angle to the axis of the rod 10 and successively cuts off a portion to produce the blanks 11 and 18.

In Figure 3 the die and punch are respectively designated 26 and 27, within the latter of which is a knockout pin 28 and within the former a guide pin 29, which holds the blank in place before the pressure operation, and also retains it in position after being lifted out of the head by the knockout pin 28 until the transfer fingers engage and carry the blank to the next succeeding station.

The die 13, as shown in Figure 5, is mounted in a block 30 and movable therein is the knockout pin 31, the upper end of which is substantially the same size and shape as the punch 32. The piercing punch 33 for forming the hole 15 co-operates for that purpose with the die 34 and plate 35 to strip the nut therefrom while the punch is being withdrawn.

The blanks are carried in any convenient manner from one station to another, preferably by carrier fingers of a well known type.

The punch 27 in Figure 9 is substantially the same as shown in Figure 3, except that its face is shaped to produce a blank with a dome upon one side thereof instead of upon both sides.

In Figure 11 the die 36 is shown as enclosing a block 37, which closes one end of the opening 14 through the die and in which the knockout rod 38 is opposite the punch 32.

In Figure 16 the punch 39 is substantially the same size as the diameter of the blank 18, and the block 37 in the die 36, as shown in Figure 20 is provided with a knockout pin 40.

It is to be expressly understood, that the terms "nuts or similar articles" as employed in the following claims definitely comprehends, not only nuts, but bolts, rivets, screws, and in fact any and all articles to which the invention is applicable.

What I claim as new and desire to secure by Letters Patent, is:

1. The method of forming nuts or similar articles having a chamfered portion, which resides in shaping a blank to have a substantially domed surface of solid cross section throughout and then forcing the blank into a confining area of predetermined configuration to form the sides of the article by pressure exerted on the central portion only of the domed surface and allowing the remainder of the domed surface to flow unrestricted whereby to form a chamfered surface on the article.

2. The method of forming nuts or similar articles having a chamfered portion, which resides in shaping a blank to have a substantially domed surface of solid cross section throughout and with a plurality of flat faces on said domed surface, which flat faces are substantially opposite that part of the blank where the sides lie in the article and then forcing the blank into a confining area of predetermined configuration to form the sides of the article by pressure exerted on the central portion only of the domed surface and allowing the remainder of the domed surface to flow unrestricted whereby to form a chamfered surface on the article.

3. The method of forming nuts or similar articles having a chamfered portion, which resides in shaping a blank to have a substantially domed surface of solid cross section throughout and then forcing the blank into a confining area of predetermined configuration to form the sides of the article by pressure exerted on the central portion only of the domed surface and allowing the remainder of the domed surface to flow unrestricted whereby to form a chamfered surface on the article, said confining area being further configured to form a collar on the underside of the article simultaneously with the formation of the sides of the article.

4. The method of forming nuts or similar articles having a chamfered portion on each face thereof which resides in shaping a blank to have a substantially domed surface of solid cross section throughout on each side thereof and then forcing the blank into a confining area of predetermined configuration to form the sides of the article by pressure exerted on the central portions only of the domed surfaces and allowing the remainder of the domed surfaces to flow unrestricted whereby to form a chamfered surface on each side of the article.

In testimony whereof, I have hereunto affixed my signature.

RICHARD LESTER WILCOX.